US009409309B2

(12) United States Patent
Kanjee et al.

(10) Patent No.: US 9,409,309 B2
(45) Date of Patent: Aug. 9, 2016

(54) OBSTRUCTION DETECTION DEVICE

(71) Applicants: Manish C. Kanjee, O'Fallon, MO (US); Vicky Diane Carroll, Troy, MO (US)

(72) Inventors: Manish C. Kanjee, O'Fallon, MO (US); Vicky Diane Carroll, Troy, MO (US)

(73) Assignee: MITEK HOLDINGS, INC., Wilmington, DE (US)

( * ) Notice: Subject to any disclaimer, the term of this patent is extended or adjusted under 35 U.S.C. 154(b) by 714 days.

(21) Appl. No.: 13/782,435

(22) Filed: Mar. 1, 2013

(65) Prior Publication Data

US 2014/0245583 A1 Sep. 4, 2014

(51) Int. Cl.

*B23P 21/00* (2006.01)
*B27F 7/15* (2006.01)

(52) U.S. Cl.

CPC .............. *B27F 7/155* (2013.01); *Y10S 100/913* (2013.01); *Y10T 29/49625* (2015.01); *Y10T 29/49764* (2015.01); *Y10T 29/53035* (2015.01); *Y10T 29/53061* (2015.01); *Y10T 29/5397* (2015.01)

(58) Field of Classification Search

CPC ... Y10S 100/913; B23Q 17/006; B23P 19/04; B27F 7/155; Y10T 29/49833; Y10T 20/53026; Y10T 29/53061; Y10T 29/49625; Y10T 29/53035; Y10T 29/5343; Y10T 29/53317; Y10T 29/53039; Y10T 29/53979; Y10T 29/49764

USPC ................. 100/209, 210, 341, 342, 348, 913; 29/281.3, 401.1, 407.01, 432, 706, 29/708, 709, 714, 798, 897.31

See application file for complete search history.

(56) References Cited

U.S. PATENT DOCUMENTS 3,433,366 A * 3/1969 White .................. B66C 19/002 188/203
3,538,843 A 11/1970 Lubin
4,295,269 A 10/1981 Wright
4,669,184 A 6/1987 Castillo
5,048,409 A 9/1991 Schulz (Continued)

FOREIGN PATENT DOCUMENTS

CA 2484131 A1 4/2005
EP 0253000 A1 1/1988

OTHER PUBLICATIONS

Mitek Industries, Inc., "MiTek® RoofGlider®, Trackless Roof Truss Roller System", © 1998, (pp. 1-4), 14515 North Outer Forty, Chesterfield, MO 63017.

(Continued)

*Primary Examiner* — Jimmy T Nguyen
(74) *Attorney, Agent, or Firm* — Senniger Powers LLP

(57) ABSTRACT

An obstruction detection device for use with a truss fabrication system including a table having spaced accessways. The obstruction detection device includes a support structure configured for movable attachment to a table having spaced accessways. An obstruction sensor is connected to the support structure and configured to detect obstructions in the spaced accessways of the table. The obstruction sensor has an activated state and a deactivated state. A control system is operatively connected to the obstruction sensor to activate and deactivate the obstruction sensor in response to a position of the obstruction sensor relative to the spaced accessways. The control system activates the obstruction sensor when the obstruction sensor is aligned with one of the spaced accessways of the table and deactivates the obstruction sensor when the obstruction sensor is out of alignment with the spaced accessways of the table.

18 Claims, 7 Drawing Sheets

(56) References Cited

U.S. PATENT DOCUMENTS

| | | | | |
|---|---|---|---|---|
| 5,092,028 | A | 3/1992 | Harnden | |
| 5,111,861 | A | 5/1992 | Gore et al. | |
| 5,211,108 | A | 5/1993 | Gore et al. | |
| 5,582,099 | A | 12/1996 | Rosser | |
| 6,079,325 | A * | 6/2000 | LePoire | B27F 7/155 100/210 |
| 6,318,251 | B1 | 11/2001 | Schulz | |
| 6,560,858 | B1 * | 5/2003 | McAdoo | B23Q 1/032 269/910 |
| 6,612,230 | B1 | 9/2003 | McAdoo et al. | |
| 6,807,903 | B2 | 10/2004 | Anderson | |
| 7,093,350 | B2 * | 8/2006 | McNeelege | B27F 7/155 100/210 |

OTHER PUBLICATIONS

ALPINE, Roll-A-Master, 2 pages, Grand Prairie, Texas, Aug. 28, 2008.

ALPINE, RAM Easy Rider, 2 pages, Grand Prairie, Texas, Feb. 15, 2010.

Canadian Office Action for Application No. 2,843,161, Mar. 7, 2016, 4 pages.

* cited by examiner

OBSTRUCTION DETECTION DEVICE

FIELD OF THE INVENTION

The present invention generally relates to obstruction detection devices, and more specifically, to an obstruction detection device for use with a truss fabrication system.

BACKGROUND OF THE INVENTION

Truss fabrication systems typically include a truss assembly table and a gantry press. The truss assembly table includes several groups of planks forming the top of the table, and accessways or walkways spaced intermittently between the groups of planks providing operators access to portions of the table spaced from its edges. Operators place truss members and connector plates on the truss assembly table in predetermined configurations to form particular trusses. After the truss members and connector plates are placed on the table, the gantry press travels along the truss assembly table to press the connector plates into the truss members, joining them together. The gantry press typically includes a roller or hydraulic platen mounted on a gantry that engages the connector plates and presses them into the truss members. The gantry has wheels that run on rails or guides extending along the sides of the table or on the floor next to the table for guiding the gantry along the table.

Obstruction detection devices are mounted on the gantry press to detect whether obstructions are present on the table that may damage the press or be damaged by the press. For example, conventional obstruction detection devices for truss fabrication systems include push rods, light curtains, or light beams mounted on the gantry press above the table planks. If a push rod is contacted by an obstruction on the table, the push rods mechanically or electrically trigger a shut-off switch to stop the gantry press, preventing the obstruction from being contacted by the press. Similarly, if a light curtain or light beam is interrupted by an obstruction on the table, a shut-off switch is triggered to stop the gantry press and prevent the obstruction from being contacted by the press. However, if an obstruction is located beneath a level of the table planks, such as an operator bent over in a walkway extending between the planks of the table, the conventional push rods, light curtains, and light beams will not detect the obstruction. If an obstruction in a walkway rises to a level above the table planks after the push rods, light curtains, or light beams pass but before the roller passes, the roller may pinch the obstruction between the roller and truss members and/or connector plates positioned on the table planks, damaging the roller or the obstruction. Thus, there is a need for an obstruction detection device capable of detecting obstructions positioned in the walkways between the planks of the table.

SUMMARY OF THE INVENTION

In one aspect, an obstruction detection device for use with a truss fabrication system including a table having spaced accessways includes a support structure configured for movable attachment to a table having spaced accessways. An obstruction sensor is connected to the support structure and configured to detect obstructions in the spaced accessways of the table. The obstruction sensor has an activated state and a deactivated state. A control system is operatively connected to the obstruction sensor to activate and deactivate the obstruction sensor in response to a position of the obstruction sensor relative to the spaced accessways. The control system activates the obstruction sensor when the obstruction sensor is aligned with one of the spaced accessways of the table and deactivates the obstruction sensor when the obstruction sensor is out of alignment with the spaced accessways of the table.

In another aspect, a truss fabrication system includes a truss assembly table having a first side rail, a second side rail, and at least one accessway. A gantry press is movably mounted on the truss assembly table. A first obstruction detection device is mounted on the gantry press. A second obstruction detection device is mounted on the gantry press opposite the first obstruction detection device. Each of the first and second obstruction detection devices includes a support structure attached to the gantry press for movement with the gantry press along the truss assembly table. An obstruction sensor is connected to each support structure and configured to detect obstructions in the at least one accessway of the table. The obstruction sensor has an activated state and a deactivated state. A control system is operatively connected to each obstruction sensor for activating and deactivating the obstruction sensor in response to a position of the obstruction sensor relative to the at least one accessway. The control system activates the obstruction sensor when the obstruction sensor is aligned with the at least one accessway of the table and deactivates the obstruction sensor when the obstruction sensor is out of alignment with the at least one accessway of the table. A controller is configured to stop movement of the gantry press along the truss assembly table when an obstruction is detected in the at least one accessway of the table by the obstruction sensor.

In yet another aspect, a method of detecting obstructions in an accessway of a truss assembly table includes activating an obstruction sensor when the obstruction sensor moves into alignment with an accessway of a truss assembly table. The obstruction sensor is deactivated when the obstruction sensor moves out of alignment with the accessway of the truss assembly table.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
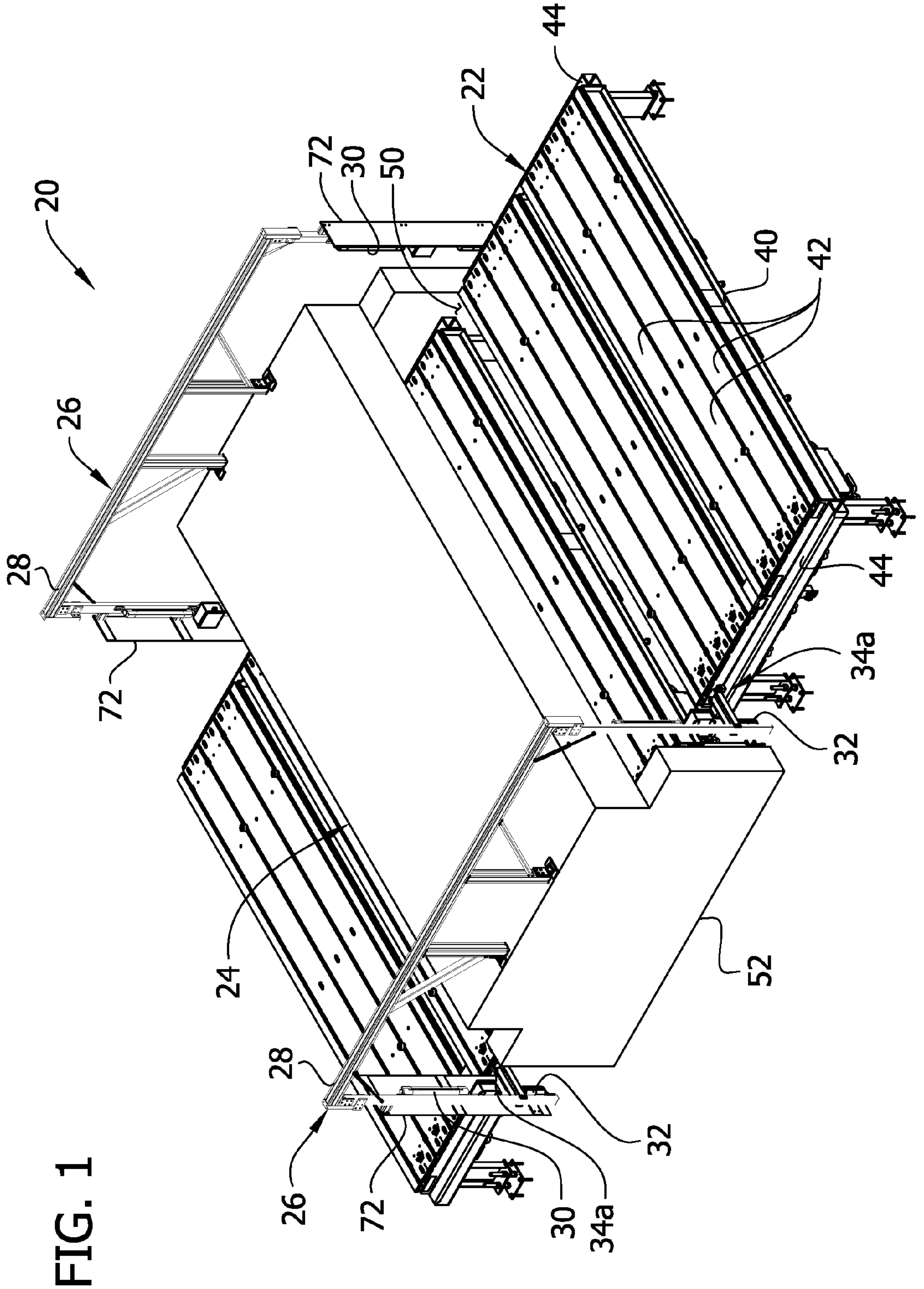
FIG. 1 is a perspective of a truss fabrication system having obstruction detection devices according to a first embodiment of the present invention.

Referring to drawings and more particularly to FIG. 1, a truss fabrication system is indicated in its entirety by the reference number 20. The system 20 generally includes a truss assembly table (generally designated by 22), a gantry press (generally designated by 24), and an obstruction detection device (generally designated by 26). The obstruction detection device 26 generally includes a frame 28 (broadly, a support structure), upper obstruction sensors 30, lower obstruction sensors 32, and control sensors 34*a*, 34*b*, as will be explained in further detail below.

As further illustrated by FIG. 1, the truss assembly table 22 has a support 40, supporting a plurality of parallel elongate planks 42 extending across the support, perpendicular to a direction of gantry press 24 travel. The planks 42 provide a substantially planar working surface for holding structural members (not shown) and connector plates (not shown) in a desired configuration. The structural members (e.g., stick lumber) and connector plates can be arranged in a desired configuration on the planks 42 to form a truss as generally known in the art. Track tubes or rails 44 extend along sides of the support 40 for guiding the gantry press 24. The support 40, planks 42, and rails 44 are omitted at intervals along the table 22 to form accessways or walkways 50 in the table 22. The accessways 50 allow operators access to locations on the table 22 remote from its edges for properly positioning structural members and connector plates.

The gantry press 24 moves relative to the truss table 22. As mentioned previously, the truss table 22 includes rails 44 for guiding the press 24 as it moves along the table. The gantry press 24 has conventional drive wheels (not shown) for moving the press back and forth along the table 22. The press 24 also includes a conventional roller or hydraulic platen (not shown) for pressing connector plates into the structural members to form trusses. The roller is rotatably mounted for rotation on the gantry press 24 and extends entirely across the table 22. The drive wheels and roller are connected in a conventional manner to one or more motors (not shown). A controller 52 is operatively connected to the drive wheels and roller to control movement of the gantry press along the rails 44 and rotation of the roller. Because the features of the gantry press 24 described above are conventional, they will not be described in further detail. Those skilled in the art will appreciate that the gantry press 24 can have other configurations, such as being guided by floor rails, without departing from the scope of the present invention.

Figure 2:
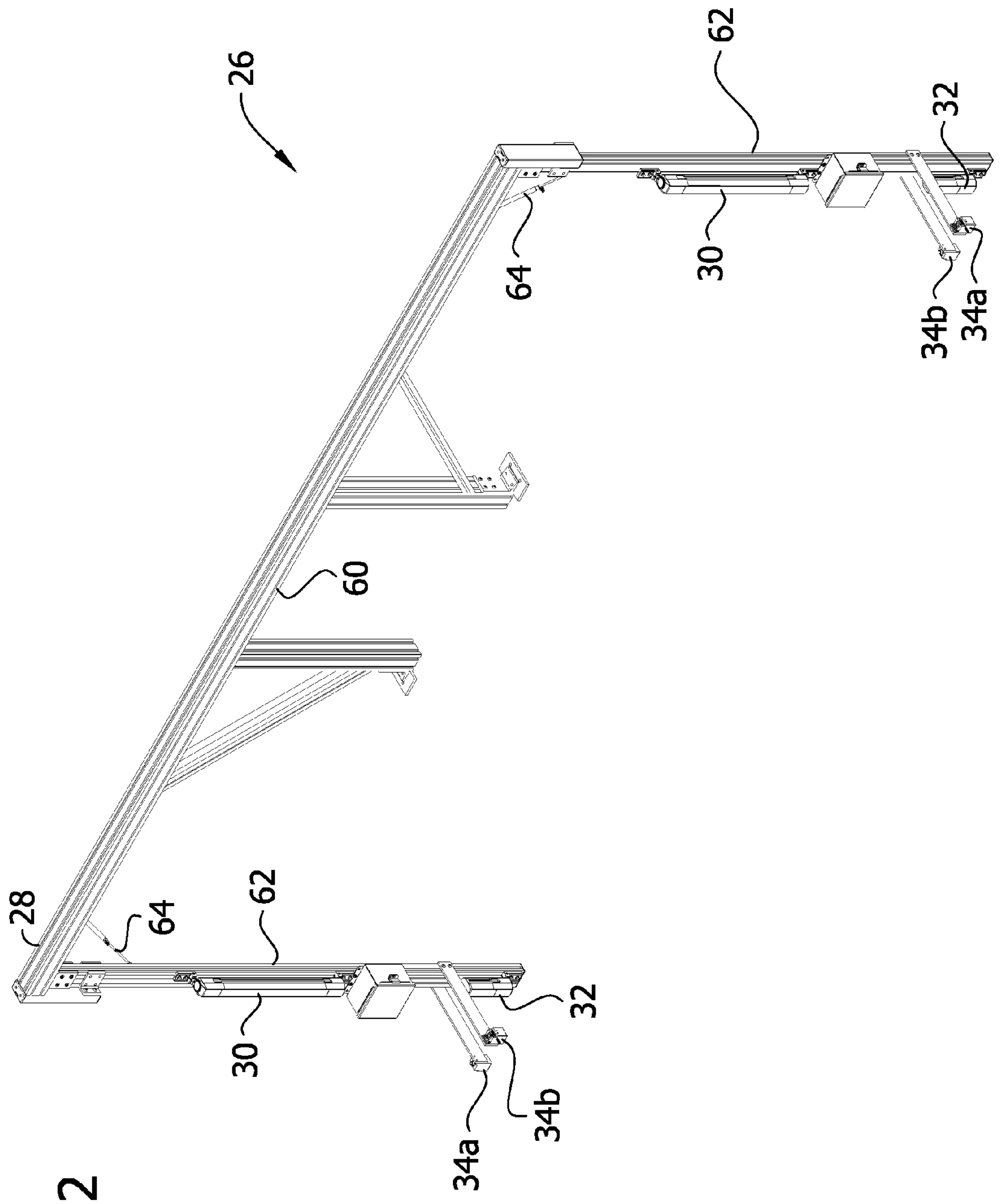
FIG. 2 is a perspective of an obstruction detection device according to the first embodiment.
Figure 3:
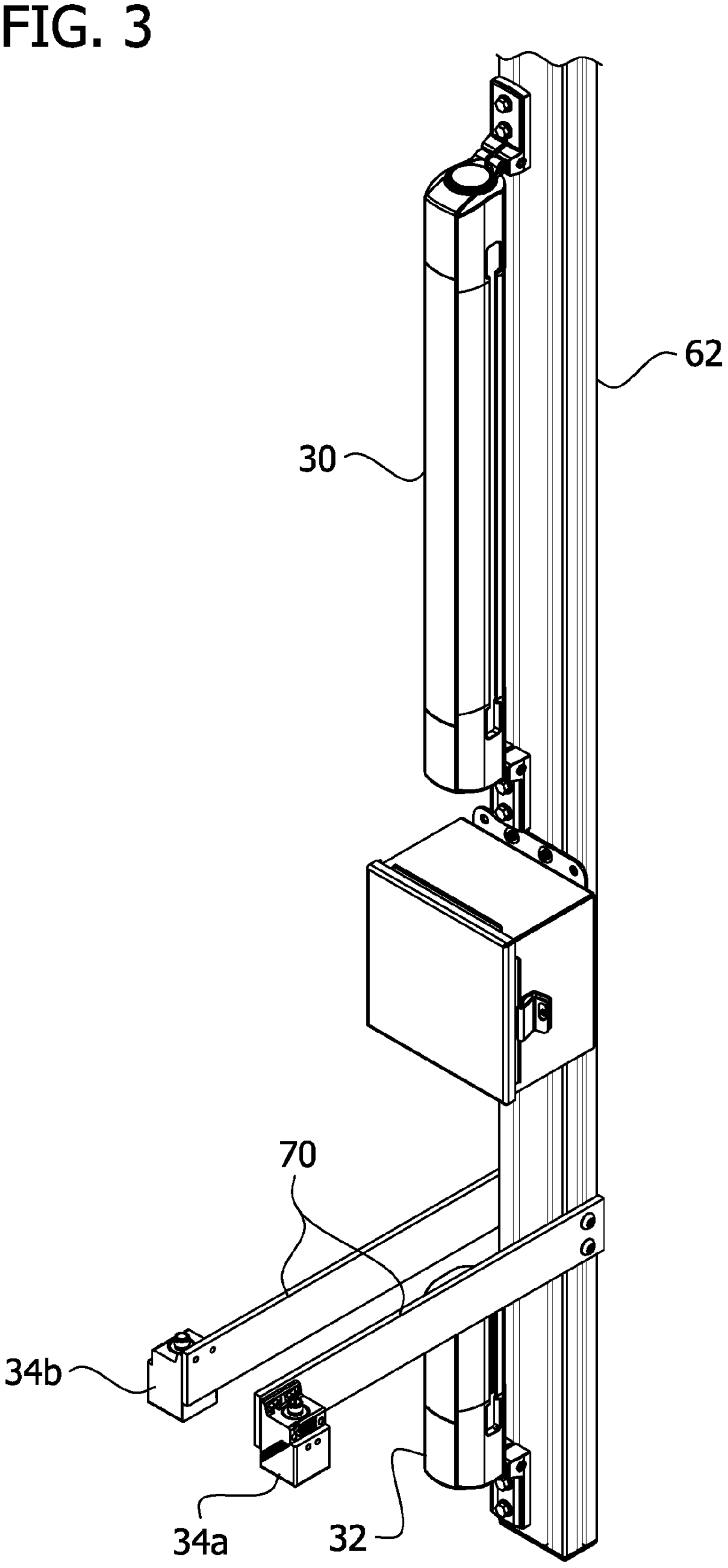
FIG. 3 is a fragmentary detail of FIG. 2, showing an arm of the obstruction detection device.

Referring to FIGS. 1-3, the obstruction detection device 26 is mounted on the gantry press 24 so the device moves with the press along the rails 44 of the truss assembly table 22. In the first illustrated embodiment, the truss fabrication system 20 has an obstruction detection device 26 mounted on opposite sides of the gantry press 24. As mentioned previously, each obstruction detection device 26 includes a frame 28, upper obstruction sensors 30, lower obstruction sensors 32, and control sensors 34*a*, 34*b*. The frame 28 includes a horizontal upper element 60 having a vertical arm 62 extending downward from each end. Although the frame 28 may be made of other materials without departing from the scope of the present invention, in one embodiment the frame is made of aluminum. In the illustrated embodiment, the frame 28 is mounted on top of the gantry press 24, but the frame may be mounted on other portions of the gantry press without departing from the scope of the present invention.

Referring to FIG. 3, the obstruction detection device 26 includes an upper obstruction sensor 30 positioned above the table 22 to detect obstructions above the table. The corresponding upper sensors 30 of each detection device 26 are aligned, forming a light curtain or detection plane extending entirely across the table 22. When light passing between the sensors 30 is interrupted, the sensors send a signal to the controller 52 indicating an obstruction is present. The upper sensor 30 is positioned high enough above the planks 42 so structural members on the table 22 are not in the detection plane formed between the sensors. When an obstruction is detected, the upper sensor 30 sends a signal to the controller 52 to stop the motor system, thereby stopping the gantry press 24 traveling before the press contacts the obstruction. Although other sensors may be used without departing from the scope of the present invention, in one embodiment the upper sensor 30 is a model MLD520-T2L/MLD520-R2L sensor available from Leuze Electronic. In the illustrated embodiment, the arms 62 are pivotable relative to the upper element 60 so the upper sensors 30 move out of alignment with each other when either of the arms contacts an obstruction positioned immediately beside the table 22 so the gantry press 24 stops traveling. As will be appreciated by those skilled in the art, whenever the gantry press 24 is traveling, the leading pair of upper sensors 30 (relative to gantry press direction of travel) is operational to signal the controller 52 and stop the gantry press when the sensors senses obstructions to prevent damage to the obstruction or gantry press. In some embodiments, the trailing pair of upper sensors 30 is not energized to reduce power consumption. In other embodiments, the trailing pair of upper sensors 30 is energized but is ignored by the controller 52. The direction of travel determines which sensors are active and which sensors are ignored. If an object is detected while the gantry is traveling, the gantry will stop and the electrical system will prevent the gantry from moving again in the first direction. The gantry will be permitted to travel in a second direction opposite from the first direction without the operator resetting the system until an obstruction is encountered in the second direction. Permitting travel in the second direction allows the operator to move the gantry away from a detected obstruction to clear the area. Once a direction has been disabled, the operator must perform a reset and acknowledge that the area has been cleared for the required travel direction. As will also be appreciated, dampers or gas springs 64 are mounted between the arms 62 and upper element 60 to prevent the arms from freely pivoting as the gantry press 24 moves.

As further illustrated in FIG. 3, the obstruction detection device 26 includes a lower obstruction sensor 32 positioned below the planks 42 of the table 22 to detect obstructions in the accessways 50 of the truss assembly table 22. The corresponding lower sensors 32 of each detection device 26 are aligned, forming a light curtain or detection plane extending entirely across the table 22. Although other sensors may be used without departing from the scope of the present invention, in one embodiment the lower sensor 32 is a model MLD520-T1/MLD520-R1 sensor available from Leuze Electronic. As will be appreciated by those skilled in the art, obstructions below the table 22 are physically blocked from contacting the gantry press 24 by the planks 42 except in the accessways 50 where obstructions can rise as the gantry press 24 passes to contact the press without breaking the light curtain formed between the upper sensors 30. To avoid sensing obstructions below the table 22 outside of the accessways 50 and unnecessarily stopping the gantry press 24, the leading pair of lower sensors 32 is only operational to signal the controller 52 and stop the gantry press when those sensors are moving across the accessways. In some embodiments, the trailing pair of lower sensors 32 is not energized for sensing objects to reduce power consumption. In other embodiments, the trailing pair of lower sensors 32 is energized but is ignored by the controller 52. In the latter case, the direction of travel determines which set of sensors are actively armed for detection, as described above in relation to the upper sensors 30.

Referring still to FIG. 3, two control sensors 34*a*, 34*b* mounted on brackets 70 extend from each arm 62 of the frame 28. The control sensors identified as 34*a* are spaced farther from the gantry press 24 than the control sensors identified as 34*b*. The control sensors 34*a*, 34*b* are positioned on opposite sides of the lower sensor 32. The corresponding control sensors 34*a*, 34*b* of each detection device 26 are aligned to detect a particular feature on the table 22 as will be explained below. Although other sensors may be used without departing from the scope of the present invention, in one embodiment each control sensor 34*a*, 34*b* is a model GM705S sensor available from IFM Efector, Inc. The leading and trailing control sensors 34*a*, 34*b*, respectively, associated with a particular pair of lower sensors 32 control when that pair of control sensors is operational to signal the controller 52 to stop the gantry press 24. The control sensors 34*a*, 34*b* are operatively connected to the lower sensors 32 and are configured to detect when the lower sensor is aligned with an accessway 50 of the truss assembly table 22. The control sensors 34*a*, 34*b* detect when the lower sensors 32 are aligned with an accessway 50 by detecting the presence of a target. In one embodiment, the target is a top surface of the side rail 44 of the truss table 22, but the control sensors 34*a*, 34*b* can be configured to detect the presence of other targets without departing from the scope of the present invention.

As shown in FIG. 1, the obstruction detection device 26 may include cover plates 72 mounted on the arms 62 to protect the sensors 30, 32, 34*a*, 34*b* from physically contacting obstructions to prevent the sensors from becoming misaligned.

Figure 4:
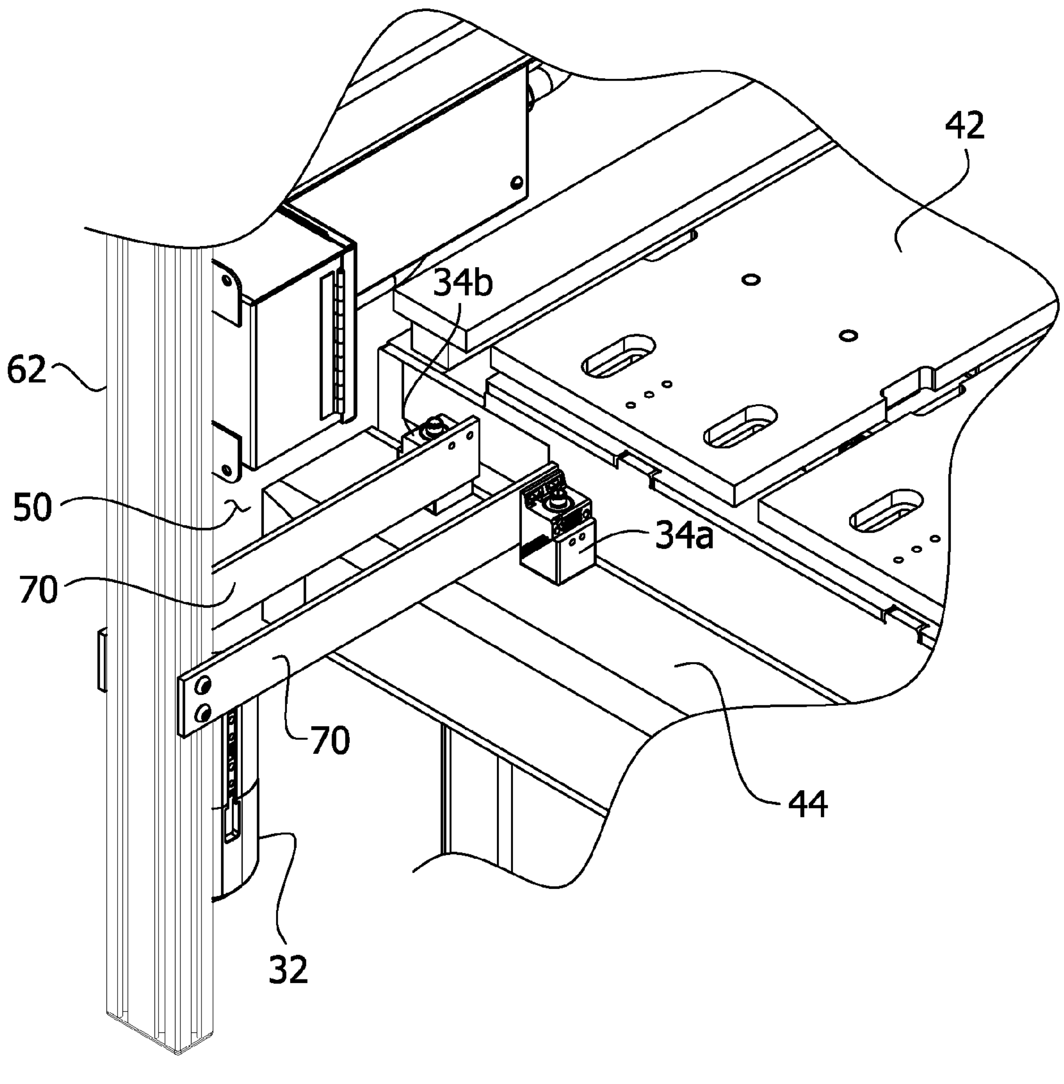
FIG. 4 is a fragmentary detail of FIG. 1, illustrating a first position of the obstruction detection device.
Figure 5:
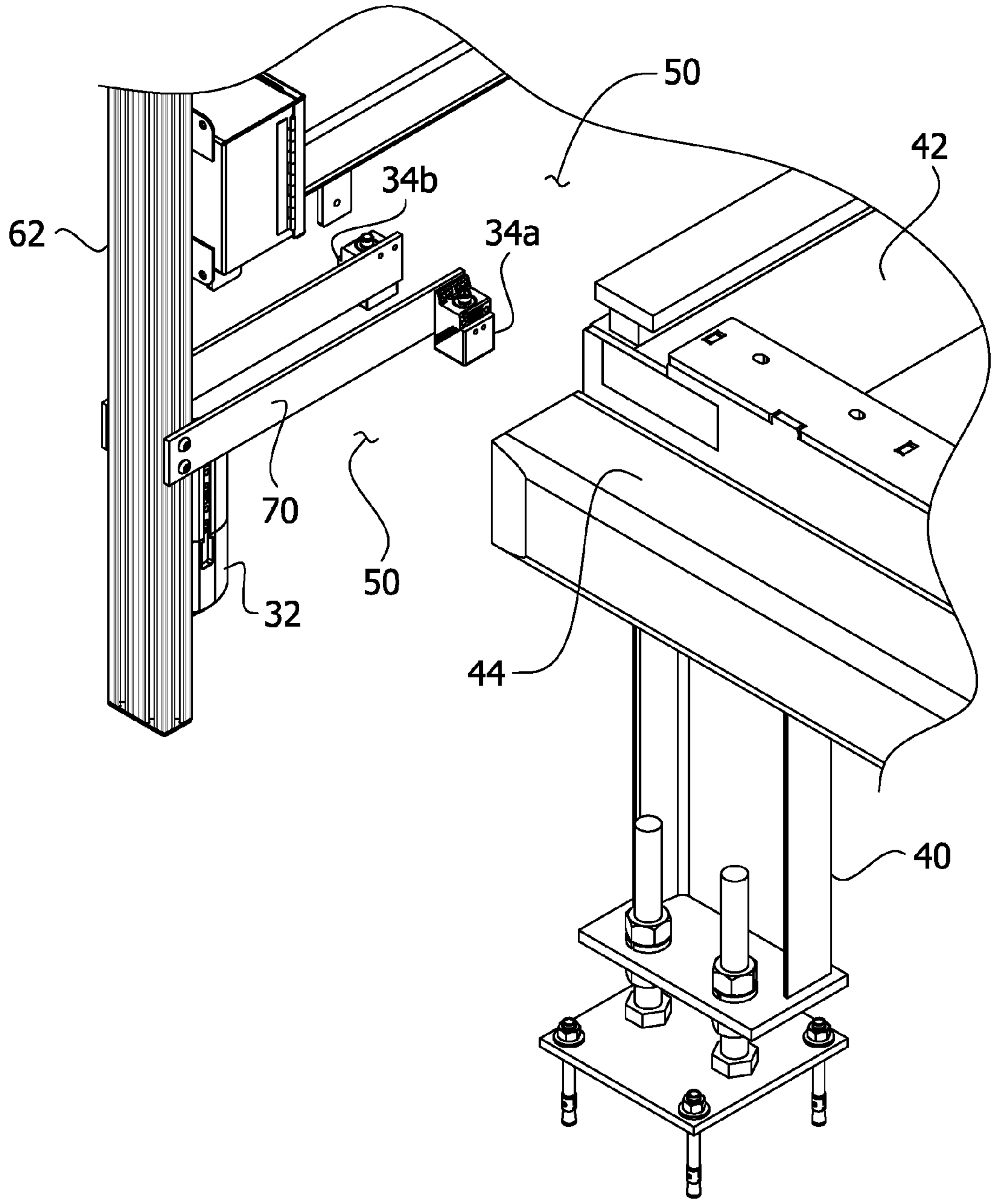
FIG. 5 is a fragmentary detail similar to FIG. 4, illustrating a second position of the obstruction detection device.

Referring to FIGS. 4 and 5, operation of the obstruction detection device will be described. As shown in FIG. 4, when the leading control sensor 34*a* detects the presence of the rail 44, it sends a signal to deactivate or mute the lower sensor 32 to prevent the obstruction sensor from stopping the gantry press 24 when the frame 40 of the table 22 breaks the light curtain. Referring to FIG. 5, when the trailing control sensor 34*b* enters one of the spaced accessways 50 of the side rail 44, it sends a signal to activate or unmute the lower sensor 32 so the lower sensor can then detect obstructions in the accessways 50 of the table 22, and signal the controller 52 to stop the gantry press 24 if an obstruction is detected.

Figure 6:
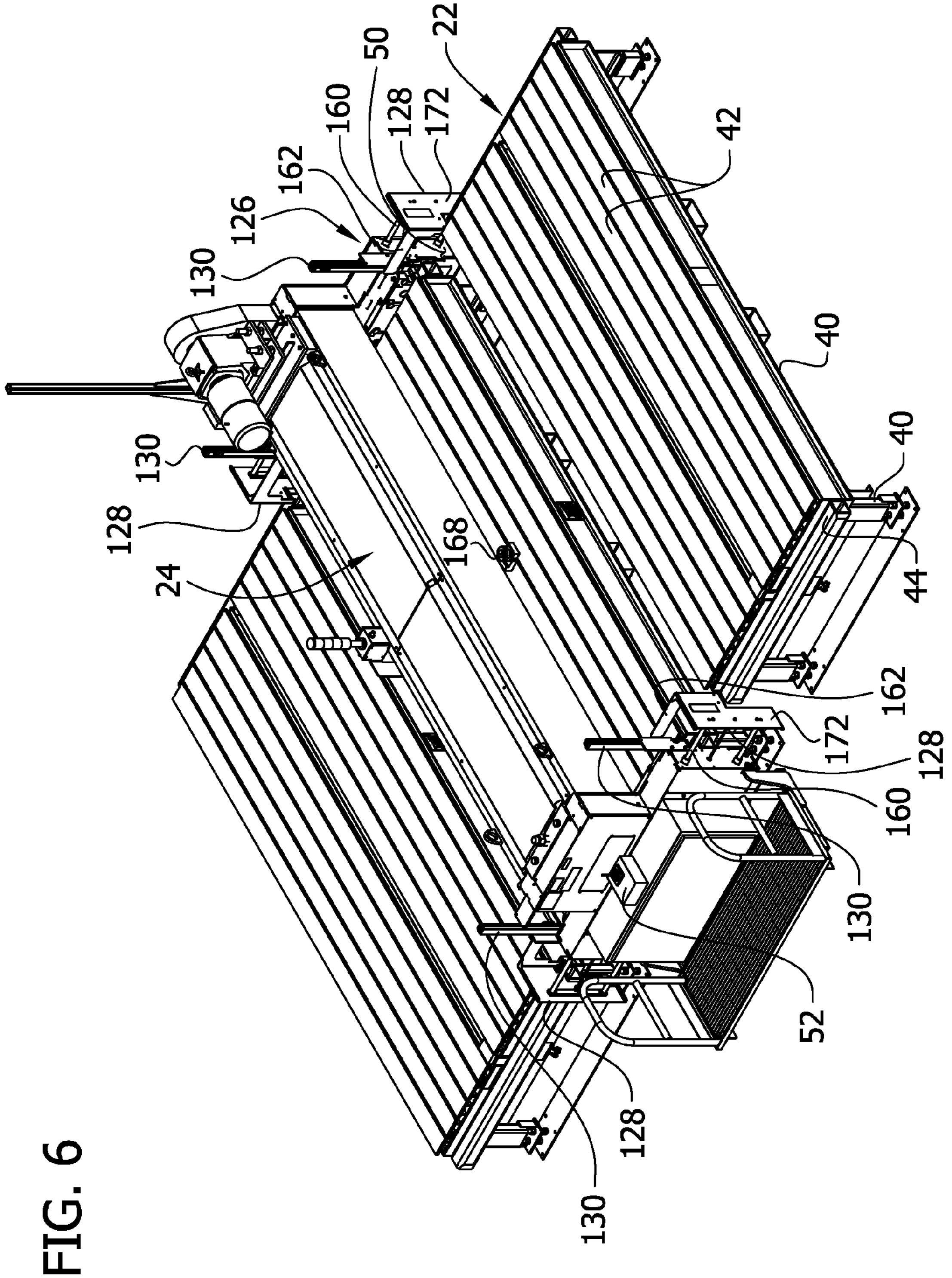
FIG. 6 is a perspective of a truss fabrication system having obstruction detection devices according to a second embodiment of the present invention.
Figure 7:
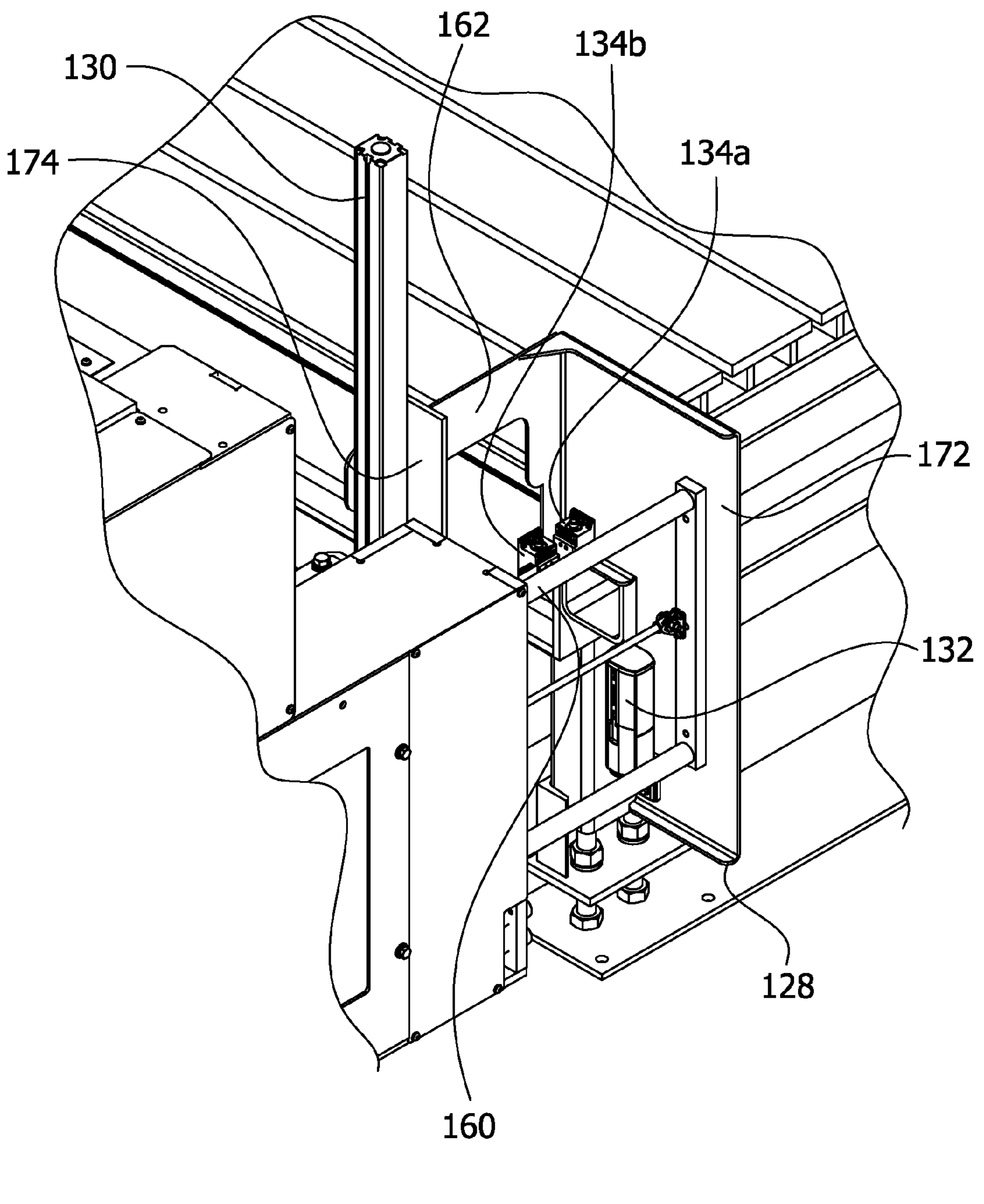
FIG. 7 is a fragmentary detail of FIG. 6, illustrating an obstruction detection device according to the second embodiment.

FIGS. 6 and 7 illustrate a second embodiment of an obstruction detection device 126. The obstruction detection device 126 is similar to the obstruction detection device 26 described above, except for the differences pointed out below. In this embodiment, the obstruction detection device 126 includes upper obstruction sensors 130, lower obstruction sensors 132, and control sensors 134*a*, 134*b* mounted on collapsible bumpers 128 (broadly, support structures).

The obstruction detection device 126 is configured for use on the truss assembly table 22, as described above in reference to the obstruction detection device 26. The obstruction detection device 126 is mounted on the gantry press 24 so the device moves with the press along the rails 44 of the truss assembly table 22. In the illustrated embodiment, the obstruction detection device 126 includes four collapsible bumpers 128 mounted on the gantry press 24. Each collapsible bumper 128 includes a support 160 mounting the bumper to the gantry press 24 and a bumper flag 162, as will be described in further detail below. Although the collapsible bumpers may be made of other materials without departing from the scope of the present invention, in one embodiment the bumpers are made of aluminum.

Referring still to FIGS. 6 and 7, the obstruction device 126, like the obstruction detection device 26, includes an upper obstruction sensor 130 positioned above the table 22 to detect obstructions above the table. The corresponding upper sensors of opposed collapsible bumpers 128 are aligned, forming a light curtain or detection plane extending entirely across the table 22. When light passing between the sensors 130 is obstructed, the sensors send a signal to the controller 52 indicating that an obstruction is present. The upper sensors 130 are positioned high enough above the planks 42 so structural members on the table 22 are not in the detection plane formed between the sensors. When an obstruction is detected, the upper sensors 130 send a signal to the controller 52 to stop the motor system, thereby stopping movement of the gantry press 24 before the press contacts the obstruction. Although other sensors may be used without departing from the scope of the present invention, in one embodiment the upper sensor 130 is a model PA46-2-500-Q2-NO1-PN sensor available from Omron Scientific Technologies, Inc.

In the illustrated embodiment, a scanner 168 is mounted on each side of the gantry press 24 at or near the center of the press. The scanners 168 can be used in addition to the upper sensors 130, or in some cases can be used instead of the upper sensors. The scanners 168 scan at least about 180 degrees on each side of the gantry press 24 to detect obstructions. If an obstruction is detected, the scanners 168 send a signal to the controller 52 to stop the motor system, thereby stopping movement of the gantry press 24 before the press contacts the obstruction. Although other scanners may be used without departing from the scope of the present invention, in one embodiment each scanner 168 is a model 0532C-BP scanner available from Omron Scientific Technologies, Inc. It is understood that the scanners 168 could also be used with the obstruction detection device 26 in addition to or instead of the upper sensors 30.

In the embodiment of FIGS. 6 and 7, each bumper 128 is collapsible so the bumper flag 162 breaks the light curtain or detection plane of the upper sensors 130 when the bumper contacts an obstruction positioned immediately beside the table 22 so the gantry 24 stops moving. A gas spring 170 mounted to the support 160 permits movement of the bumper 128 relative to the gantry press 24. The bumper flag 162 is positioned relative to the upper sensor 130 such that minimal movement of the flag towards the gantry 24 will break the light curtain of the upper sensors and signal the controller 52 to stop the gantry. As will be appreciated by those skilled in the art, whenever the gantry press 24 is moving, the leading (relative to the gantry press direction of travel) pair of upper sensors 130 is operational to signal the controller 52 to stop the gantry press when the sensors sense obstructions to prevent damage to the obstruction or gantry press. In some embodiments, the trailing pair of upper sensors 130 is not energized to reduce power consumption. In other embodiments, the trailing pair of upper sensors 130 is energized but is ignored by the controller 52. The direction of travel from the controller 52 determines which sensors are actively looking for an obstruction and which sensors are ignored. If an object is detected while the gantry travels in a first direction, the gantry will stop and the electrical system will be disabled from traveling again in the first direction. The gantry will be permitted to move in a second direction opposite from the first direction without the operator resetting the system until an obstruction is encountered in the second direction. Permitting the gantry to move in the second direction allows the operator to move the gantry away from a detected obstruction to clear the area. Once a direction has been disabled, the operator must perform a reset to acknowledge the area has been cleared for the required travel direction.

As further illustrated in FIG. 7, the obstruction detection device 126 includes a lower obstruction sensor 132 positioned below the planks 42 of the table 22 to detect obstructions in the accessways 50 of the truss assembly table 22. The lower obstruction sensor 132 of the obstruction detection device 126 works as described above with reference to the lower obstruction sensor 32 of the obstruction detection device 26. The corresponding lower sensors 132 on each bumper 128 are aligned, forming a light curtain or detection plane extending entirely across the table 22. If the collapsible bumper 128 contacts an obstruction and collapses, the corresponding lower sensor 132 moves out of alignment with the other sensor, breaking the light curtain extending between the lower sensors. The light curtain between the lower sensors 132 is also broken by an obstruction positioned between the sensors. Although other sensors may be used without departing from the scope of the present invention, in one embodiment the lower sensor is a model MLD520-T1/MLD520-R1 sensor available from Leuze Electronic. As will be appreciated by those skilled in the art, obstructions below the table 22 are physically blocked from contacting the gantry press 24 by the planks 42 except in the accessways 50 where the obstructions can rise as the gantry press passes to come in contact with the press without breaking the light curtain formed between the upper sensors 130. To avoid sensing obstructions below the table 22 outside of the accessways 50 and unnecessarily stopping the gantry press 24, the leading pair of lower sensors 132 is only operational to signal the controller 52 and stop the gantry press when those sensors are moving across the accessways. In some embodiments, the trailing pair of lower sensors 132 is not energized for sensing objects to reduce power consumption. In other embodiments, the trailing pair of lower sensors 132 is energized but is ignored by the controller 52. In the latter case, the direction of travel determines which set of sensors are actively armed for detection, as described above in relation to the upper sensors 130.

Referring still to FIGS. 6 and 7, two control sensors 134*a*, 134*b* are mounted on each bumper 128. The control sensors 134*a*, 134*b* can be mounted on a bracket (not shown) mounted to a front plate 172 of the bumper 128, to the support 160, on the front plate of the bumper, or any combination thereof. The control sensor 134*a* is spaced farther from the gantry press 24 than the control sensor 134*b*. The control sensors 134*a*, 134*b* are positioned on opposite sides of the lower sensor 132. The corresponding control sensors 134*a*, 134*b* of opposing bumpers 128 are aligned to detect a particular feature on the table 22. Although other sensors may be used without departing from the scope of the present invention, in one embodiment each control sensor 134*a*, 134*b* is a model GM705S sensor available from IFM Efector, Inc. The leading and trailing control sensors, 134*a*, 134*b*, respectively, associated with a particular pair of lower sensors 132 control when that pair of control sensors is operational to signal the controller 52 to stop the gantry press 24. The control sensors 134*a*, 134*b* are operatively connected to the lower sensors 132 and are configured to detect when the lower sensor is aligned with an accessway 50 of the truss assembly table 22. The control sensors 134*a*, 134*b* detect when the lower sensors 132 are aligned with an accessway 50 by detecting the presence of a target. In one embodiment, the target is a top surface of the side rail 44 of the truss table 22, but the control sensors 134*a*, 134*b* can be configured to detect the presence of other targets without departing from the scope of the present invention As illustrated, the front plates 172 of each bumper 128 protect the sensors 132, 134*a*, 134*b* from physically contacting obstructions to prevent the sensors from becoming misaligned or physically damaged. A cover plate 174 can also be included to protect the upper sensors 130 from physically contacting obstructions.

The operation of the obstruction detection device 126 is similar to the operation of the obstruction detection device 26 described above. When the leading control sensor 134*a* detects the presence of the rail 44, it sends a signal to deactivate or mute the lower sensor 132 to prevent the obstruction sensor from stopping the gantry press 24 when the frame 40 of the table 22 breaks the light curtain. When the trailing control sensor 134*b* enters one of the spaced accessways 50 of the side rail 44, it sends a signal to activate or unmute the lower sensor 132 so the lower sensor can then detect obstructions in the accessways 50 of the table 22, and signal the controller 52 to stop the gantry press 24 if an obstruction is detected.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. An obstruction detection device for use with a truss fabrication system including a truss assembly table having spaced accessways, a controller, and a gantry press mounted on the truss assembly table for movement relative to the truss assembly table, the obstruction detection device comprising:

a support structure configured for attachment to the truss assembly table having spaced accessways for movement relative to the truss assembly table;

an obstruction sensor mounted on the support structure and configured to detect obstructions in the spaced accessways of the truss assembly table, the obstruction sensor having an activated state and a deactivated state; and a control system operatively connected to the obstruction sensor to activate and deactivate the obstruction sensor in response to a position of the obstruction sensor relative to the spaced accessways, wherein the control system activates the obstruction sensor when the obstruction sensor is aligned with one of the spaced accessways of the truss assembly table so that the obstruction sensor can detect obstruction in the spaced accessway and signal the controller to stop the gantry press of the truss fabrication system if an obstruction is detected, and wherein the control system deactivates the obstruction sensor when the obstruction sensor is out of alignment with the spaced accessways of the truss assembly table to prevent the obstruction sensor from stopping the gantry press of the truss fabrication system.

2. The obstruction detection device of claim 1, wherein the control system comprises a first control sensor configured to detect when the obstruction sensor is aligned with one of the spaced accessways of the truss assembly table.

3. The obstruction detection device of claim 2, wherein the control system further comprises a second control sensor configured to detect when the obstruction sensor is aligned with one of the spaced accessways of the truss assembly table.

4. The obstruction detection device of claim 3, wherein the first and second control sensors are configured to detect the presence or absence of a target in order to determine whether the obstruction sensor is aligned with one of the spaced accessways of the truss assembly table.

5. The obstruction detection device of claim 3, wherein the support structure comprises a frame including a first leg and a second leg, the obstruction sensor, the first control sensor, and the second control sensor being mounted on the first leg of the frame.

6. The obstruction detection device of claim 5, further comprising an upper sensor mounted on the first leg of the frame at a position above the obstruction sensor, the upper sensor being configured to detect obstructions above the table.

7. The obstruction detection device of claim 6, further comprising a plurality of cover plates, each of the cover plates being mounted on a respective one of the obstruction sensor, the first control sensor, the second control sensor, and the upper sensor to protect the sensors.

8. The obstruction detection device of claim 1, wherein the support structure is configured to move upon contact with an obstruction.

9. The obstruction detection device of claim 1, wherein the support structure comprises a collapsible bumper.

10. A truss fabrication system comprising:

a truss assembly table having a first side rail, a second side rail, and at least one accessway;

a gantry press mounted on the truss assembly table for movement relative to the truss assembly table;

a first obstruction detection device being mounted on the gantry press;

a second obstruction detection device mounted on the gantry press opposite the first obstruction detection device, each of the first and second obstruction detection devices comprising:

a support structure attached to the gantry press for movement with the gantry press along the truss assembly table;

an obstruction sensor connected to the support structure and configured to detect obstructions in the at least one accessway of the table, the obstruction sensor having an activated state and a deactivated state; and a control system operatively connected to the obstruction sensor for activating and deactivating the obstruction sensor in response to a position of the obstruction sensor relative to the at least one accessway, wherein the control system activates the obstruction sensor when the obstruction sensor is aligned with the at least one accessway of the truss assembly table so that the obstruction sensor can detect obstruction in the spaced accessway, and wherein the control system deactivates the obstruction sensor when the obstruction sensor is out of alignment with the at least one accessway of the truss assembly table to prevent the obstruction sensor from stopping the gantry press of the truss fabrication system; and the control system further comprising a controller configured to stop movement of the gantry press along the truss assembly table when an obstruction is detected in the at least one accessway of the truss assembly table by the obstruction sensor.

11. The truss fabrication system of claim 10, wherein the control system of each of the first and second obstruction detection devices comprises a first control sensor configured to detect when the obstruction sensor is aligned with the at least one accessway of the truss assembly table.

12. The truss fabrication system of claim 11, wherein the control system of each of the first and second obstruction detection devices further comprises a second control sensor configured to detect when the obstruction sensor is aligned with the at least one accessway of the truss assembly table.

13. The truss fabrication system of claim 12, wherein the first and second control sensors of each of the first and second obstruction detection devices are configured to detect the presence or absence of the respective first and second side rails of the table in order to determine whether the obstruction sensor is aligned with the at least one accessway of the truss assembly table.

14. The truss fabrication system of claim 12, wherein the support structure of each of the first and second obstruction detection devices comprises a frame including a first leg and a second leg, the obstruction sensor, the first control sensor, and the second control sensor being mounted on the first leg of the frame.

15. The truss fabrication system of claim 14, wherein each of the first and second obstruction detection devices further comprises an upper sensor mounted on the first leg of the frame at a position above the obstruction sensor, the controller being configured to stop movement of the gantry press along the truss assembly table when an obstruction is detected by the upper sensor.

16. The truss fabrication system of claim 12, wherein the support structure of each of the first and second obstruction detection devices comprises a collapsible bumper, the obstruction sensor, the first control sensor, and the second control sensor being mounted on the collapsible bumper.

17. The truss fabrication system of claim 10, wherein the obstruction sensor of the first obstruction detection device cooperates with the obstruction sensor of the second detection device to detect obstructions in the at least one accessway of the truss assembly table, such that when the obstruction sensors of the first and second obstruction detection devices are activated, a light curtain is formed therebetween and the controller stops movement of the gantry press along the truss assembly table if an obstruction interrupts the light curtain.

18. The truss fabrication system of claim 17, wherein the each support structure is configured to move upon contact with an obstruction, such that the light curtain between the obstruction sensors is interrupted and the controller stops movement of the gantry press.

* * * * *